Sept. 18, 1956     A. RODER     2,763,496
FRAME ARRANGEMENT FOR BICYCLES AND MOTORCYCLES
Filed March 31, 1953
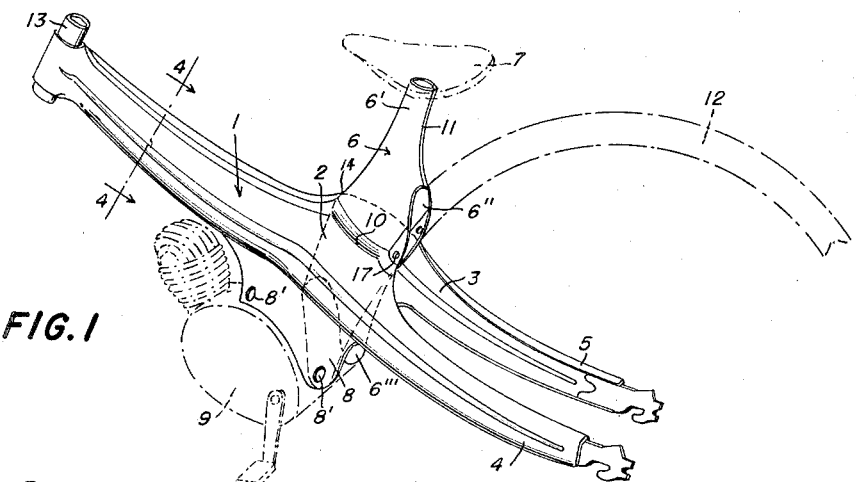
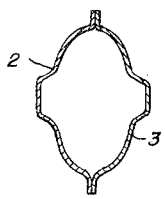
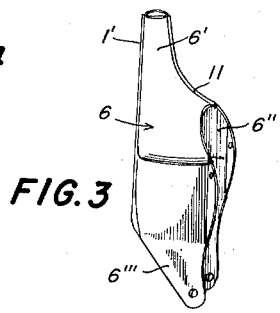
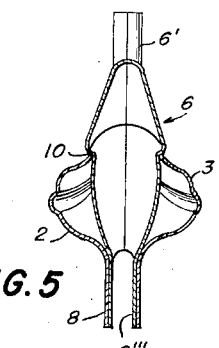
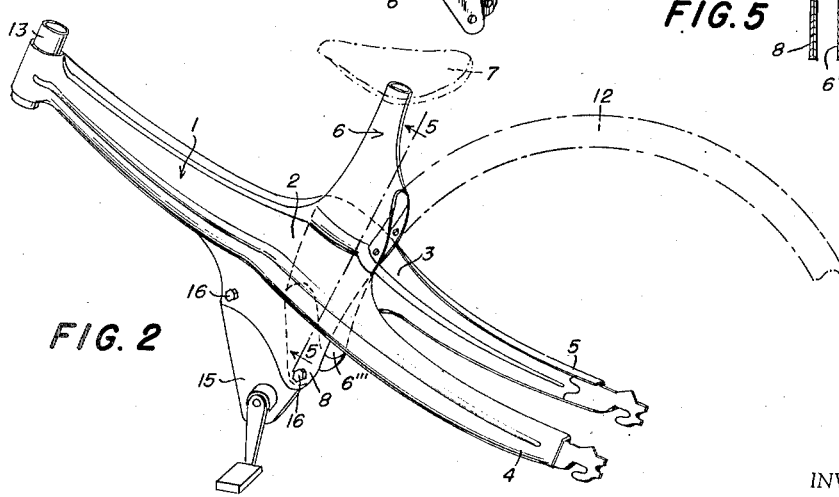
INVENTOR
ALBERT RODER
BY *Glascock Downing & Seebold*
ATTORNEYS United States Patent Office 2,763,496
Patented Sept. 18, 1956

2,763,496

FRAME ARRANGEMENT FOR BICYCLES AND MOTORCYCLES

Albert Roder, Neckarsulm, Wurttemberg, Germany, assignor to NSU Werke Aktiengesellschaft, Neckarsulm, Wurttemberg, Germany Application March 31, 1953, Serial No. 345,757

Claims priority, application Germany April 9, 1952

12 Claims. (Cl. 280—281)

The invention relates to a frame arrangement for bicycles, motor cycles, miniature motor cycles and the like. The main requirements which have to be taken into account for the construction of such a frame consists in the need for low weight, relatively great stability, simplest possible construction, freedom from vibration and suitability for mass production.

Accordingly the present invention has for an object to provide a frame structure of the type described which will fully satisfy the aforestated conditions. It is a particular object of this invention to provide a frame arrangement which includes a supporting structure for the vehicle saddle and a main longitudinal supporting structure consisting of two complemental metallic frame members rigidly interconnected extending rearwardly from a steering head receiving portion and diverging to form a fork adapted to support a rear wheel mounting, and in which the longitudinal support includes depending components and the saddle carrying support extends through the main support at the vertex of the fork and includes a lower supporting portion reinforcing the depending supports of the main support and which cooperate therewith in selectively receiving a propulsion engine or a pedal assembly.

This combination is outstanding in its operation, because the continuous main support is not only strengthened at the forked end, but in addition the tilting stresses which originate from the rear wheel mounting and which could be converted into torsional stresses at the point of connection of the fork parts of the main support, are almost completely prevented.

This outstanding effect of the combination in accordance with the invention obviously results in it being possible, with a given required strength of the total arrangement, to use considerably smaller weights than would otherwise be necessary.

In addition, a favourable arrangement for connecting the mudguard or rear wheel fender is obtained by a suitable shaping of the supporting member for the saddle.

Since a characteristic feature of the frame arrangement according to the invention is that the lower end of the supporting member for the saddle is a direct extension of the axis of the supporting member, the pedalling forces of the person sitting on the saddle are transmitted in a straight line as propelling forces, so that supplementary secondary stresses in relation to the main support cannot occur. Tests have shown the the frame arrangement according to the invention is mainly very suitable for light motor cycles. No difficulties are presented in arranging the engine, the gear and the crank arrangement on the lower reinforced supporting structure of the main support member with minimum space requirements, so that a neat and convenient assembly of low weight and relatively great stability is obtained.

Further details of the invention will be apparent from the following description of two constructional examples which are illustrated in the accompanying drawings, wherein:

Figure 1 is a perspective view of a motor cycle frame arrangement constructed in accordance with the invention, Figure 2 is a perspective view of a bicycle frame arrangement constructed in accordance with the invention, Figure 3 is a perspective view of the auxiliary support.

Figure 4 is a cross sectional view taken along lines 4—4 of Figure 1, and

Figure 5 is a cross sectional view taken along lines 5—5 of Figure 2.

As shown in the drawings, the frame structure denoted generally at 1 comprises a pair of complemental members 2 and 3. These members constitute the main longitudinal frame for the vehicle and extend from a steering head receiving portion 13 to a rear portion that is forked to provide spaced arms 4 and 5 adapted to receive and mount a rear wheel. The halves of the main longitudinal support are rigidly interconnected by welding along the top edges thereof to the vertex 14 of the fork. A weld joint rigidly interconnects the lower edges of the halves of the longitudinal frame for a portion of their length rearwardly from the steering head receiving position. However, a supporting cheek 8 depends beneath each of the respective parts 2 and 3 of the main support. This supporting cheek extends from the main position in front of the vertex 14 to a position rearwardly thereof. Apertures 8' are provided in the cheeks for receiving fastening bolts and cooperate with a flange or the like formed on a propulsion engine denoted at 9. These supporting cheeks 8 further can be utilized as shown in Figure 2 to interchangeably receive a pedal assembly 15, Figure 2 illustrating bolt means 16 securing the pedal assembly in position.

It is further to be pointed out that the upper edges of the rigidly interconnected components 2 and 3 are arcuate in plan from the vertex 14 rearwardly. The auxiliary support includes a supporting structure denoted at 6 likewise composed of two complemental members. The supporting structure 6 has these members rigidly interconnected at weld seam 11. The supporting structure 6 is shaped to provide a tubular portion 6' adapted to receive the saddle post of the saddle denoted diagrammatically at 7, an intermediate portion that has a rearwardly directed opening 6" and a lower portion comprising spaced cheeks 6'''. The spaced cheeks 6''' have an aperture therein in alignment with the lowermost apertures in the cheeks 8. Furthermore, the cheeks 8 and the cheeks 6''' are of plate-like formation and are rigidly interconnected preferably by spot welding. The upper edge of the main support members 2 and 3 is bent in toward the supporting structure 6 and includes a beveled edge 10 welded to the exterior of the main support 6. The auxiliary support 6 in that portion lying within the vertex is of arcuate external contour so as to provide a smooth and effective juncture between the main longitudinal frame and the auxiliary support.

The lower and forked end of the auxiliary support 6 that is the cheeks 6''' reinforce the cheeks 8 and supplements the action thereof in supporting either the engine 9 or the pedal assembly 15.

It is clear therefore that the support of the present invention comprises two two-part frame components, the main frame 1 having a closed portion and forked ends and the auxiliary frame 6 having a closed upper portion 6' and diverging arms or portions 6'''. The closed upper portion 6' extends from a position spacedly above the upper edges of the arms 4 and 5 so that the rear fender denoted diagrammatically at 12 can be fitted within the opening 6" and secured therein, preferably by bolts passing through bolt holes 17. The auxiliary support 6 extends rearwardly from the vertex to such an extent that only bending stresses can be transmitted to the forked ends or arms 4 and 5. Further the main support 1 and the auxiliary support being stamped sheet metal parts, each constitute what can be termed box girders so that a light-weight rigid frame is provided.

I claim:

1. A pressed metal frame for bicycles, motorcycles, and the like vehicles comprising a main longitudinal frame structure consisting of a pair of complemental sheet metal members having a length to extend from a steering head receiving portion to a rear wheel assembly receiving portion, means rigidly interconnecting the members for a portion of their length rearwardly of the steering head receiving portion, the members including rearwardly diverging arms constituting a fork adapted to accommodate the rear wheel assembly; said members each further including a supporting cheek depending beneath the level of the arms and extending longitudinally from a point in front of the vertex of the fork to a point rearwardly thereof but adjacent thereto, an auxiliary support comprising a pair of complemental rigidly interconnected sheet metal members extending through the main frame at the vertex of the fork including an upper portion extending above the vertex and adapted to receive a saddle post and a diverging lower portion constituting spaced supplemental cheeks lying within and secured to said first mentioned cheeks and all said cheeks being adapted to selectively support a motor propulsion unit or a pedal assembly.

2. A frame as claimed in claim 1, in which the portion of the auxiliary support extending above the vertex includes an uppermost tubular portion and a rearwardly open portion immediately above the arms, said rearwardly open portion being adapted to receive a fender and including means whereby a fender can be rigidly connected therewith.

3. A frame as claimed in claim 1, in which the upper edges of the arms from the vertex to a longitudinal position rearwardly adjacent thereto are arcuate in plan, said auxiliary support having opposite arcuately shaped sides engaging and secured to the arcuate portions of the upper edges of the arms.

4. A frame structure for bicycles, motorcycles and the like vehicles comprising a pair of forked members each comprising rigidly interconnected half members, one of said forked members constituting a longitudinal frame structure having one end adapted to receive a steering head assembly and including arms diverging from a vertex provided in the upper edges thereof to constitute a rear wheel assembly receiving fork, a propulsion unit supporting structure depending beneath said one forked member at least in that area underlying the vertex, said other forked member extending through the first forked member at the vertex of the fork and including an upper portion adapted to support a saddle and a diverging lower portion and means connecting said other frame member to said first forked member including a connection between the diverging ends of said other forked member and the depending supporting structure to reinforce the latter and co-operate therewith in supporting a propulsion unit.

5. A vehicle frame construction comprising two complemental frame elements joined and extending from a steering head receiving portion to a rear wheel assembly receiving portion and including rearwardly diverging arms comprising a fork, each element including a depending supporting cheek, said arms having a vertex lying within the longitudinal extent of the cheeks, and a support member extending through the said joined frame elements at the vertex of said arms and including an upper portion adapted to support a saddle and a lower portion connected to said cheeks to reinforce the same whereby the reinforced cheeks and lower portion of said support member are adapted to support a vehicle propulsion structure.

6. The invention as set forth in claim 5 and in which the upper portion of said support member comprises an uppermost tubular saddle post receiving portion and the lower portion of said support member comprises a rearwardly facing and open hood-shaped portion.

7. A vehicle frame construction comprising two complemental metal frame elements joined and extending from a steering head receiving portion to a rear wheel assembly receiving portion including rearwardly diverging arms comprising a fork, a supporting structure depending beneath said frame elements and extending longitudinally thereof to positions in front of and behind the vertex of the arms, and a support member connected to said joined frame elements and extending above and below the same at the vertex of said fork, the upper portion of said support member constituting a saddle mast and the lower portion of said support member reinforcing the depending supporting structure.

8. A frame for bicycles and the like comprising in combination two joined complemental elements comprising a main support extending rearwardly from a steering head receiving portion and including arms diverging from a vertex and constituting a fork adapted to receive a rear wheel assembly, an auxiliary support extending through said main support at the vertex of the fork and including an upper saddle receiving portion and a lower supporting structure extending below the arms, a supporting structure depending from each element in the vicinity of the vertex and likewise extending below the arms, said auxiliary support including side faces contacting the upper edges of the arms from the vertex to a position rearwardly adjacent the vertex, said auxiliary support being shaped in correspondence with the shape of the upper edges of the arms at and rearwardly adjacent the vertex of the said fork of the main support and a welded connection between the auxiliary support and the upper edges of the arms.

9. The invention as claimed in claim 8 in which the engagement between said auxiliary support and the fork is constituted by edge deformations of the arms.

10. The invention as claimed in claim 9 in which the upper portion of said auxiliary further comprises an uppermost welded seam tubular saddle post receiving portion and a subjacent rearwardly open hood portion immediately above the arms.

11. The invention as claimed in claim 10 in which the said hood portion is shaped complemental to a fender and includes means whereby a fender can be secured thereto.

12. The invention as claimed in claim 11 in which the said hood portion of said auxiliary support has a longitudinal extent rearwardly of the vertex of said fork whereby the said fork is subjected to bending forces only.

References Cited in the file of this patent

UNITED STATES PATENTS

| 2,378,961 | Wallace et al. | June 26, 1945 |
| 2,545,142 | Falchetto | Mar. 13, 1951 |

FOREIGN PATENTS

| 872,334 | France | Feb. 9, 1942 |
| 972,065 | France | Aug. 23, 1950 |
| 202,050 | Great Britain | Aug. 13, 1923 |
| 410,461 | Italy | Apr. 11, 1945 |